(12) United States Patent
Yu et al.

(10) Patent No.: US 11,372,434 B2
(45) Date of Patent: Jun. 28, 2022

(54) POWER REGULATOR AND POWER REGULATING METHOD

(71) Applicant: GIGA-BYTE TECHNOLOGY CO., LTD., New Taipei (TW)

(72) Inventors: Wen Hua Yu, New Taipei (TW); Wen An Yang, New Taipei (TW)

(73) Assignee: GIGA-BYTE TECHNOLOGY CO., LTD., New Taipei (TW)

(*) Notice: Subject to any disclaimer, the term of this patent is extended or adjusted under 35 U.S.C. 154(b) by 313 days.

(21) Appl. No.: 16/693,034

(22) Filed: Nov. 22, 2019

(65) Prior Publication Data
US 2020/0192409 A1   Jun. 18, 2020

(30) Foreign Application Priority Data

Dec. 14, 2018 (TW) ................................. 107145144

(51) Int. Cl.
| | |
|---|---|
| G05F 1/46 | (2006.01) |
| G05F 1/66 | (2006.01) |
| G06F 1/32 | (2019.01) |
| G06F 1/3237 | (2019.01) |
| G06F 1/324 | (2019.01) |
| G06F 1/3234 | (2019.01) |
| G06F 1/3206 | (2019.01) |

(52) U.S. Cl.
CPC ............... *G05F 1/461* (2013.01); *G05F 1/46* (2013.01); *G05F 1/462* (2013.01); *G05F 1/66* (2013.01); *G06F 1/32* (2013.01); *G06F 1/324* (2013.01); *G06F 1/3206* (2013.01); *G06F 1/3237* (2013.01); *G06F 1/3243* (2013.01); *G05F 1/467* (2013.01); *Y02D 10/00* (2018.01)

(58) Field of Classification Search
None
See application file for complete search history.

(56) References Cited

U.S. PATENT DOCUMENTS

| | | | | |
|---|---|---|---|---|
| 5,852,348 | A  * | 12/1998 | Lin ........................... | F21S 4/10 |
| | | | | 315/185 R |
| 6,473,608 | B1 * | 10/2002 | Lehr ......................... | G05F 1/66 |
| | | | | 455/402 |
| 9,195,286 | B2 * | 11/2015 | Cheng .................... | G06F 1/3206 |
| 11,237,578 | B2 * | 2/2022 | Wright ..................... | H03L 5/02 |

(Continued)

OTHER PUBLICATIONS

First Office Action, CN 201811532731.5, dated Jun. 24, 2021, 4 pages. (Year: 2021).*

(Continued)

*Primary Examiner* — Tanh Q Nguyen
(74) *Attorney, Agent, or Firm* — Maschoff Brennan

(57) ABSTRACT

A power regulator is applied to regulate a work frequency of a central processing unit and the power regulator comprises a power resister, a voltage amplifier and an analog-to-digital converter. The power resister is coupled to a load to generate a first voltage. The voltage amplifier is coupled to the power resister to output a second voltage. The analog-to-digital converter is coupled to the voltage amplifier, converts the second voltage into a control signal and transmits the control signal to the central processing unit. The control signal is switched between a first level and a second level according to a value of the second voltage.

11 Claims, 5 Drawing Sheets

(56) References Cited

U.S. PATENT DOCUMENTS

| | | | | |
|---|---|---|---|---|
| 2006/0214649 A1* | 9/2006 | Herzinger | ............ | H03G 3/3047 |
| | | | | 323/282 |
| 2016/0041207 A1* | 2/2016 | Cheng | ....................... | G06F 1/28 |
| | | | | 307/131 |
| 2020/0192409 A1* | 6/2020 | Yu | ......................... | G06F 1/3237 |

OTHER PUBLICATIONS

Notification to Grant Patent Right for Invention, CN 201811532731. 5, dated Aug. 2, 2021, 2 pages. (Year: 2021).*

* cited by examiner

US 11,372,434 B2

POWER REGULATOR AND POWER REGULATING METHOD

CROSS-REFERENCE TO RELATED APPLICATIONS

This non-provisional application claims priority under 35 U.S.C. § 119(a) on Patent Application No(s). 107145144 filed in Republic of China on Dec. 14, 2018, the entire contents of which are hereby incorporated by reference.

BACKGROUND

1. Technical Field

This disclosure relates to a power regulator, especially for a power regulator applied to a central processing unit.

2. Related Art

Based on the requirements of the electronic product safety regulations, a total power consumption of a host system can't be greater than a rated power of a transformer attached to the host system. Due to the increasing demands of consumers for augmenting external devices, the number of USB ports of the host system must also be continuously increased, so that the transformer of the host system must be designed to have a higher rated power in compliance with the electronic product safety regulations.

For example, a rated power of an electronic product is 65 W and the electronic product must be equipped with a transformer whose rated power is at least 65 W. When the number of USB ports of the electronic product is increased and the total power of the electronic product increases to 67 W, the electronic product must be equipped with a new transformer whose rated power is at least 67 W (e.g. 95 W). When the host system must be equipped with a transformer with a higher rated power, it will inevitably increase manufacturing cost and lead to a decline in competitiveness. In addition, a transformer with higher rated power usually has larger volumes, so it is not suitable to equip with a microcomputer, a tablet, or a thin type laptop.

Therefore, there is indeed a need for an improved power regulator, which can at least improve the above disadvantages.

SUMMARY

According to one or more embodiments of this disclosure, a power regulator is applied to regulate a work frequency of a central processing unit and the power regulator comprises a power resister, a voltage amplifier and an analog-to-digital converter. The power resister is coupled to a load to generate a first voltage. The voltage amplifier is coupled to the power resister to output a second voltage. The analog-to-digital converter is coupled to the voltage amplifier, converts the second voltage into a control signal and transmits the control signal to the central processing unit. The control signal is switched between a first level and a second level according to a value of the second voltage.

According to one or more embodiments of this disclosure, a power regulating method is provided. The power regulating method comprises: providing a voltage power to a power regulator; coupling a load to generate a first voltage via a power resister of the power regulator; receiving the first voltage to output a second voltage via a voltage amplifier of the power regulator; optionally converting a value of the second voltage into a first level or a second level via an analog-to-digital converter of the power regulator; and optionally maintaining or regulating a work frequency of a central processing unit according to the first level or the second level.

BRIEF DESCRIPTION OF THE DRAWINGS

The present disclosure will become more fully understood from the detailed description given herein below and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
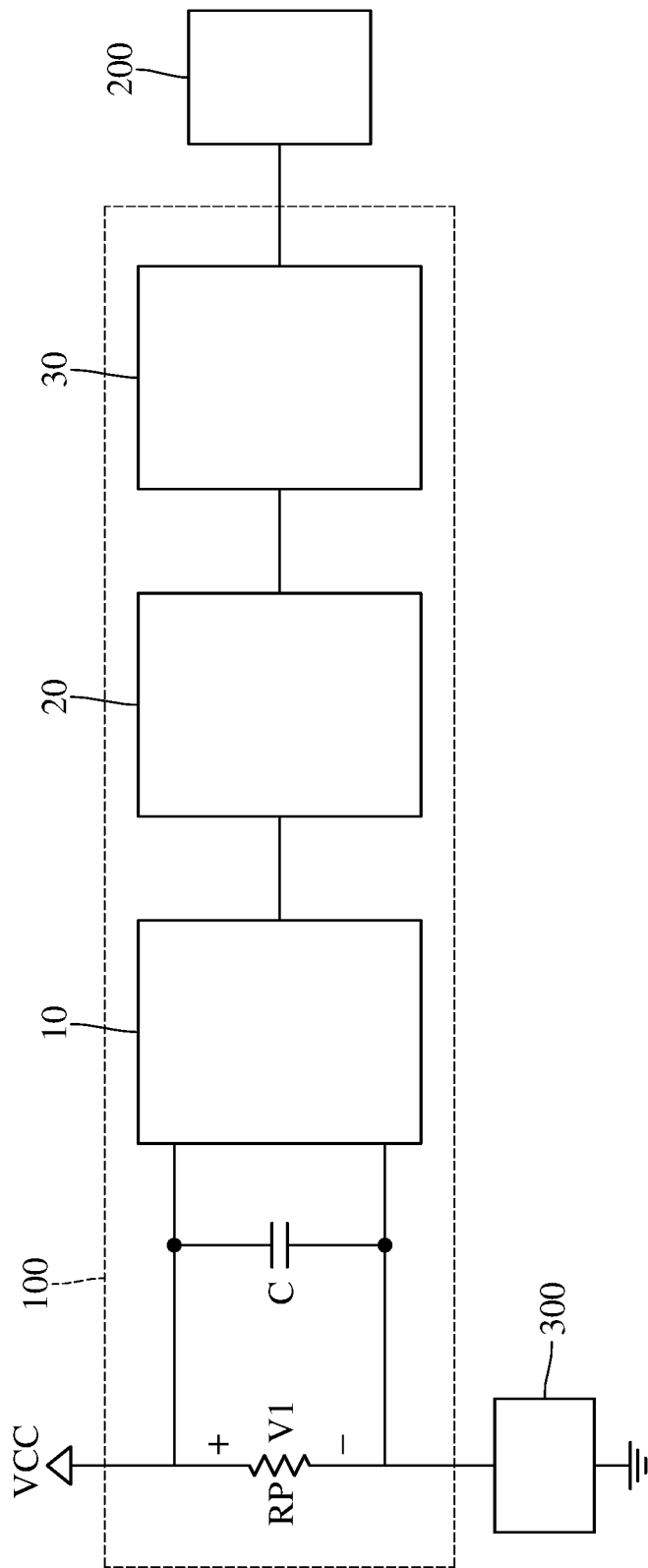
FIG. 1 is a functional block diagram of a power regulator according to an embodiment of the present disclosure.
Figure 2:
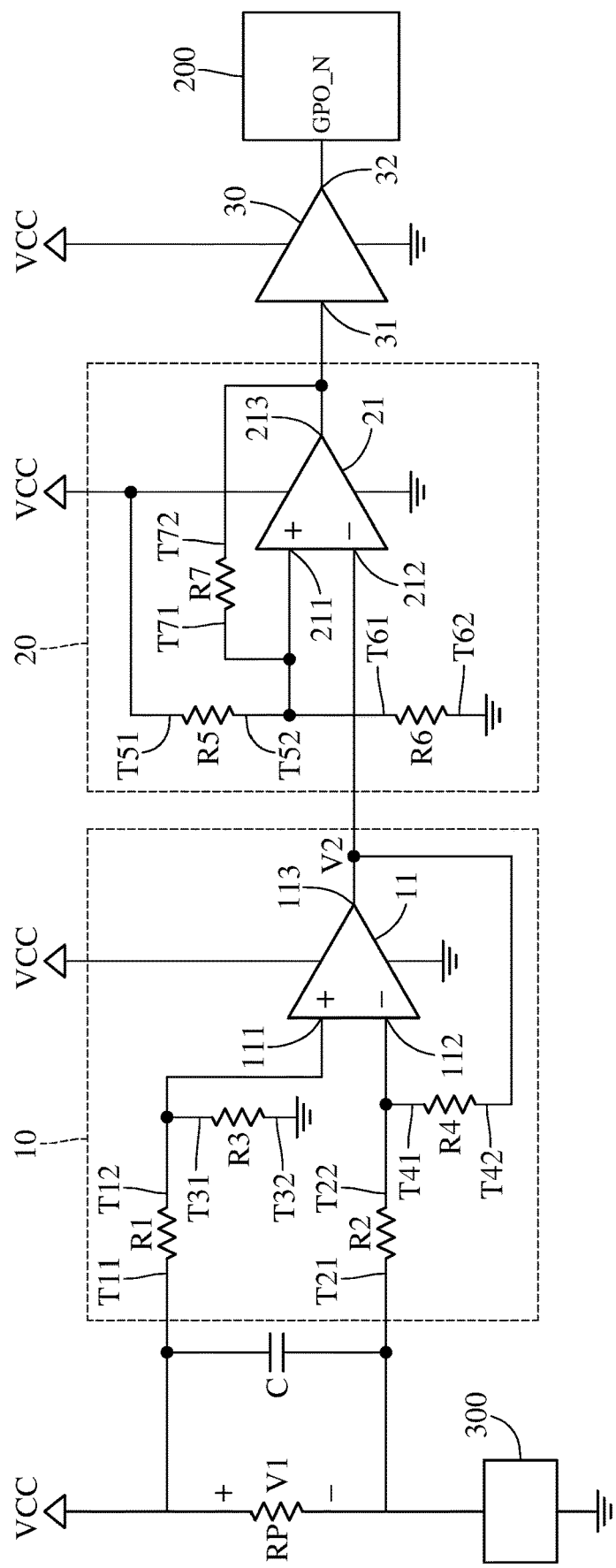
FIG. 2 is a circuit diagram of the power regulator of FIG. 1.

FIG. 1 is a functional block diagram of a power regulator according to a first embodiment of the present invention, and FIG. 2 is a circuit architecture diagram of the power regulator of FIG. 1. As shown in FIGS. 1 and 2, the power regulator 100 can be applied to a host system equipped with an external transformer. For example, the host system may be a microcomputer, a tablet, or a thin type laptop. The power regulator 100 can be mounted on a motherboard of the host system and electrically connected to a central processing unit 200 on the motherboard to adjust a work frequency of the central processing unit 200.

In this embodiment, a BIOS chip on the motherboard provides a voltage power (VCC) to enable the power regulator 100, wherein a value of the voltage power VCC is 5V. The power regulator 100 can comprise a power resistor RP, a capacitor C, a voltage amplifier 10, an analog-to-digital converter 20, and a buffering circuit 30. One end of the power resistor RP is coupled to the voltage power VCC and the other end is connected in series with a load 300, and the capacitor C is connected in parallel with the power resistor RP. An input end of the voltage amplifier 10 is coupled to the power resistor RP and the capacitor C, and an output end of the voltage amplifier 10 is coupled to an input end of the analog-to-digital converter 20. An output end of the analog-to-digital converter 20 is coupled to an input end of the buffering circuit 30, and an output end of the buffering circuit 30 is coupled to the central processing unit 200.

In this embodiment, the load 300 can be USB ports of the host system. When the number of external devices coupled to the USB ports of the host system is larger, a total power consumption generated by the load 300 is also greater. When the total power consumption of the load 300 is larger, a value of a current flowing through the power resistor RP and a value of a first voltage V1 across the power resistor RP are all larger. In other embodiment, the load 300 can also be a source end of the motherboard for coupling with the external transformer. For safety reasons, a user can select the power resistor RP having appropriate resistance (R) and Watt (W) to determine a value of the current flowing through the power resistor RP. For example, a value of a power of the selected power resistor RP can be at least 1 W and the resistance of the selected power resistor RP can be at least 1 mΩ.

When a quality of the external device (such as a power source) is poor, noises may occur from the load 300. At this time, the capacitor C connected in parallel with the power resistor RP may have the function of filtering the noises. When the quality of the external device is good, the power regulator 100 can also omit the capacitance C. On the other hand, when the position of the capacitor C on the motherboard is closed to the voltage amplifier 10, the effect of filtering noises is better.

Because the value of the first voltage V1 across the power resistor RP is usually small, the first voltage V1 must be amplified by the voltage amplifier 10 so as to conform to a detection range of the analog-to-digital converter 40. The voltage amplifier 10 includes a first resistor R1, a second resistor R2, a third resistor R3, a fourth resistor R4, and a first operational amplifier 11. A first end T11 of the first resistor R1 and a first end T21 of the second resistor R2 are respectively coupled to a positive pole of the capacitor C and a negative pole of the capacitor C. A first end T31 of the third resistor R3 is coupled to a second end T12 of the first resistor R1 and a non-inverting input end 111 of the first operational amplifier 11. A second end T32 of the third resistor R3 is grounded. A first end T41 of the fourth resistor R4 is coupled to a second end T22 of the second resistor R2 and an inverting input end 112 of the first operational amplifier 11. A second end T42 of the fourth resistor R4 is coupled to an output end 113 of the operational amplifier 11. The non-inverting input end 111 of the first operational amplifier 11 and the inverting input end 112 of the first operational amplifier 11 receive the first voltage V1, the first operational amplifier 11 amplifies the first voltage V1 and the output end 113 of the first operational amplifier 11 outputs a second voltage V2. A voltage gain (R2/R1) of the voltage amplifier 10 is determined according to a resistance of the first resistor R1, a resistance of the second resistor R2, a resistance of the third resistor R3, and a resistance of the fourth resistor R4, wherein a better voltage gain of the voltage amplifier 10 is greater than 200. In this embodiment, the resistance of the first resistor R1 and the resistance of the second resistor R2 are the same, such as 4.99 KΩ, and the resistance of the third resistor R3 and the resistance of the fourth resistor R4 are the same, such as 1 MΩ.

In one embodiment, the analog-to-digital converter 20 may comprise a hysteresis circuit and a second operational amplifier 21, wherein the hysteresis circuit comprises a fifth resistor R5, a sixth resistor R6, and a seventh resistor R7. A first end T51 of the fifth resistor R5 is coupled to the voltage power VCC, and a second end T52 of the fifth resistor R5 is coupled to a first end T61 of the sixth resistor R6, a first end T71 of the seventh resistor R7, and a non-inverting input end 211 of the second operational amplifier 21. A second end T62 of the sixth resistor R6 is grounded. The output end 113 of the first operational amplifier 11 is coupled to an inverting input end 212 of the second operational amplifier 21. A second end T72 of the seventh resistor R7 is coupled to an output end 213 of the second operational amplifier 21. The analog-to-digital converter 20 converts the second voltage V2 to a control signal, wherein the second voltage V2 is an analog signal and is outputted by the voltage amplifier 10. The control signal is a digital signal, and the output end 213 of the second operational amplifier 21 outputs the control signal. Moreover, the control signal can be switched between a first level and a second level according to an amount of the second voltage V2, wherein the first level is smaller than the second level.

The hysteresis circuit of the analog-to-digital converter 20 presets a hysteresis upper limit threshold voltage VH and a hysteresis lower limit threshold voltage VL, and a formula 1 for calculating VH and a formula 2 for calculating VL are described below:

$$R7/R5=VL/(VH-VL),\qquad\text{(formula 1)}.$$

$$R6/R5=VL/(VCC-VH),\qquad\text{(formula 2)}.$$

Because a value of VH, a value of VL, a value of VCC, and a resistance of the fifth resistor R5 are known, the resistance of the sixth resistor R6 and the resistance of the seventh resistor R7 can be calculated according to formula 1 and formula 2. When a value of the second voltage V2 outputted by the voltage amplifier 10 is less than the value of VL, the analog-to-digital converter 20 outputs a first control signal. When the value of the second voltage V2 outputted by the voltage amplifier 10 is greater than the value of VH, the analog-to-digital converter 20 outputs a second control signal, and a level of the first control signal is smaller than a level of the second control signal. For example, a value of the first control signal is zero, and a value of the second control signal is 5V.

An input end 31 of the buffering circuit 30 is coupled to the output end 213 of the second operational amplifier 21, and an output end 32 of the buffering circuit 30 is coupled to a pin GPO_N of the central processing unit 200. The buffering circuit 30 can be used to isolate the central processing unit 200 from the analog-to-digital converter 20 and to avoid that a level of a voltage outputted to the central processing unit 200 is too high. In addition, because other powers of the central processing unit 200 feeding to the hysteresis circuit effect a calculation of VH and a calculation of VL, the buffering circuit 30 may also prevent the other powers of the central processing unit 200 from feeding to the hysteresis circuit.

When the analog-to-digital converter 20 outputs the first control signal to the buffering circuit 30, the buffering circuit 30 may receive the first control signal and output the first control signal to the pin GPO_N of the central processing unit 200. The first control signal indicates that the total power consumption of the load 300 has reached or exceeded a rated power. At this time, the work frequency of the central processing unit 200 is decreased from a first work frequency (e.g., 2.7 GHz) to a second work frequency (e.g., 1.3 GHz) according to the first control signal so as to reduce the total power consumption of the central processing unit 200. However, when the level of pin GPO_N returns to a high level, the central processing unit 200 stops reducing its power. On the contrary, when the analog-to-digital converter 20 outputs the second control signal to the buffering circuit 30, the buffering circuit 30 receives the second control signal and outputs the second control signal to the pin GPO_N of the central processing unit 200. The second control signal indicates that the total power consumption of the load 300 does not reach the rated power. At this time, the central processing unit 200 keeps its work frequency as the first work frequency. In other embodiment, a drop amount of a work frequency of the central processing unit 200 may be positively proportional to a difference between the total power consumption of the load 300 and the rated power.

Figure 3:
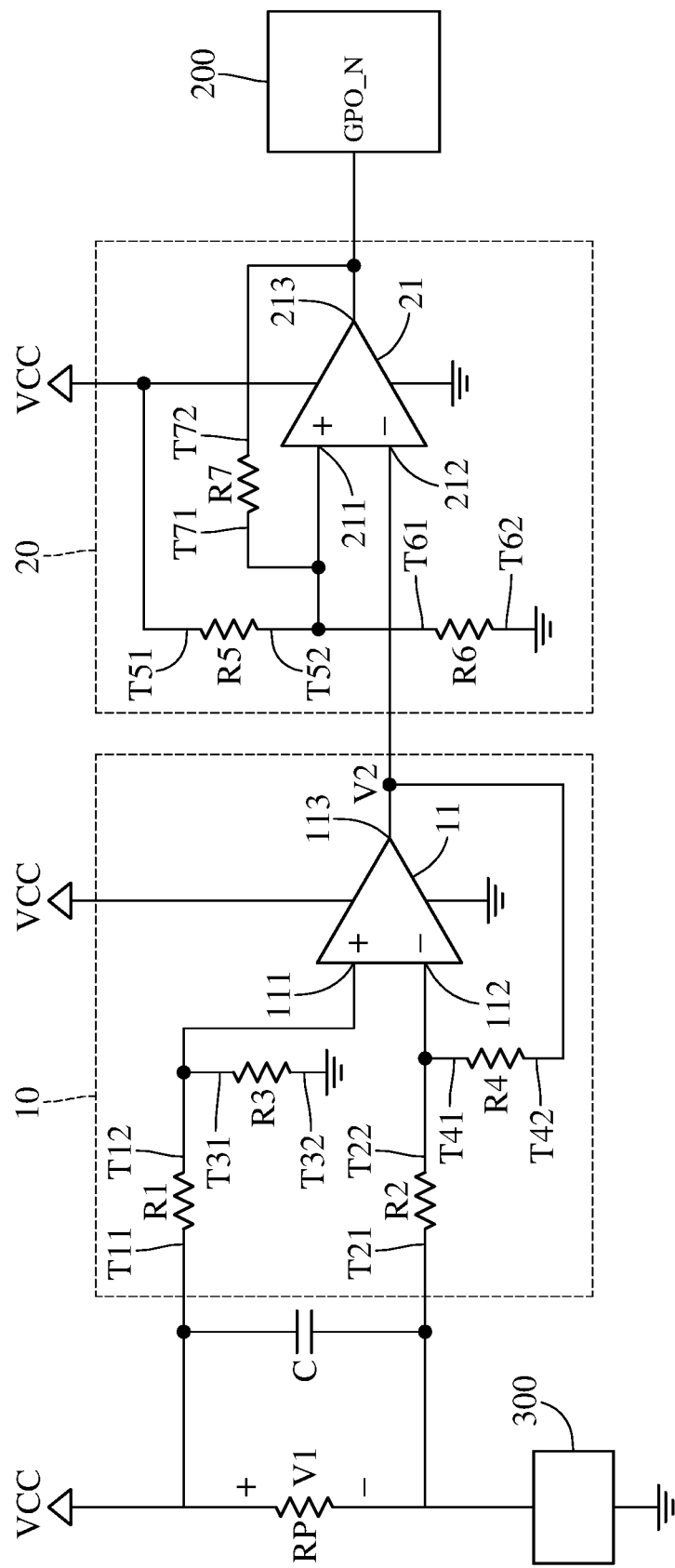
FIG. 3 is circuit diagram of a power regulator according to a second embodiment of the present disclosure.

FIG. 3 is a circuit diagram of a power regulator according to a second embodiment of the present invention. The difference between the first embodiment and the second embodiment is that the power regulator 100 omits the buffering circuit 30, so that the output end 213 of the second operational amplifier 21 of the analog-to-digital converter 20 is directly coupled to the pin GPO_N of the central processing unit 200 for reducing an area of the power regulator 100 on the motherboard and saving costs.

Figure 4:
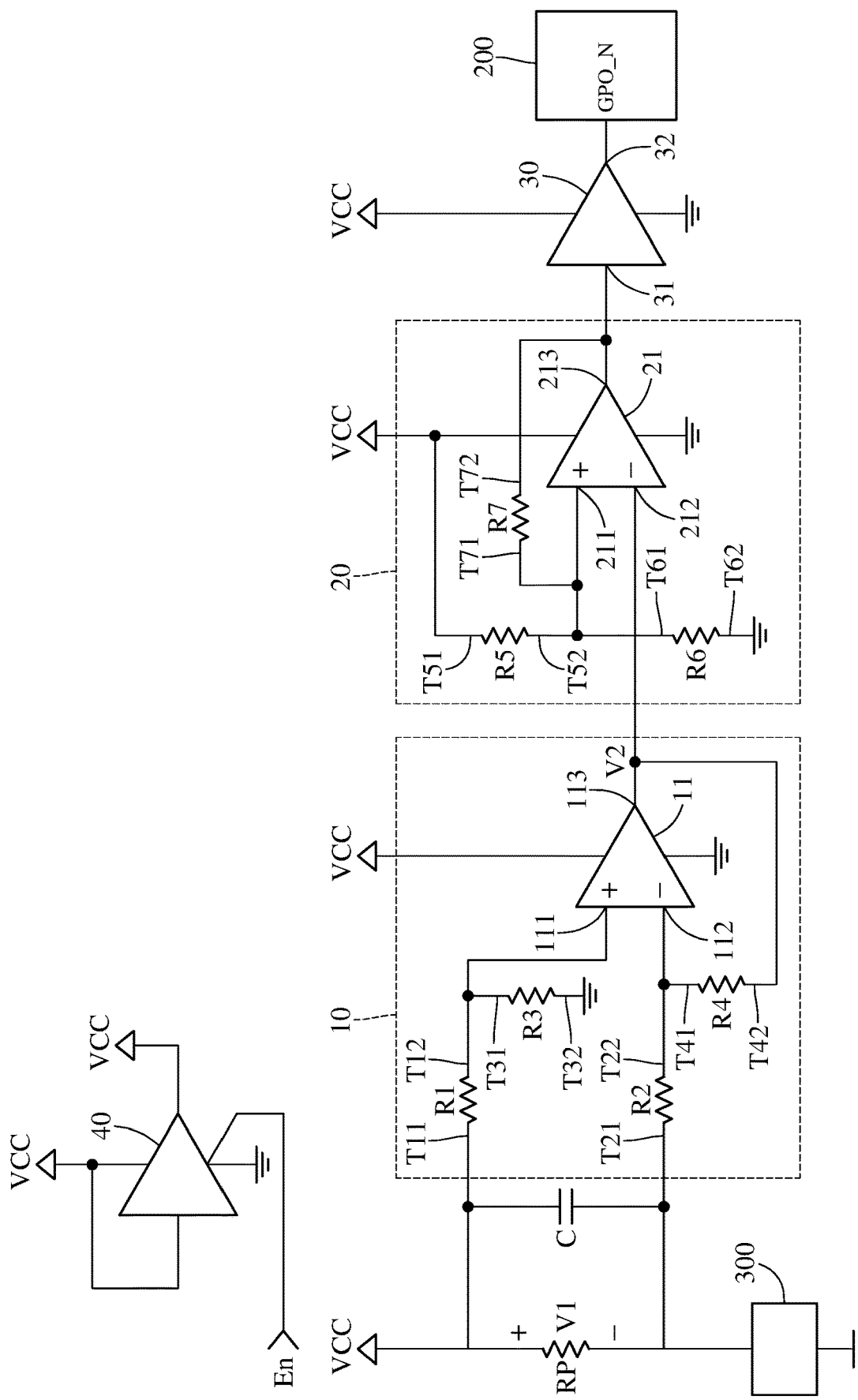
FIG. 4 is a circuit diagram of a power regulator according to a third embodiment of the present disclosure.

FIG. 4 is a circuit diagram of a power regulator according to a third embodiment of the present invention. The difference between the third embodiment and the first embodiment is that the power for enabling the power regulator 100 is not provided by the BIOS chip. The power regulator 100 further comprises an enabling circuit 40, and the enabling circuit 40 can be configured to receive an enabling signal En from an external device of the host system. When the enabling circuit 40 receives the enabling signal En, the voltage power VCC is provided to the power resistor RP, the voltage amplifier 10, and the analog-to-digital converter 20. In this way, a user can use an external device to supply different voltages to the power regulator 100 according to his requirements, so that it is more flexible and convenient to use the power regulator 100.

Figure 5:
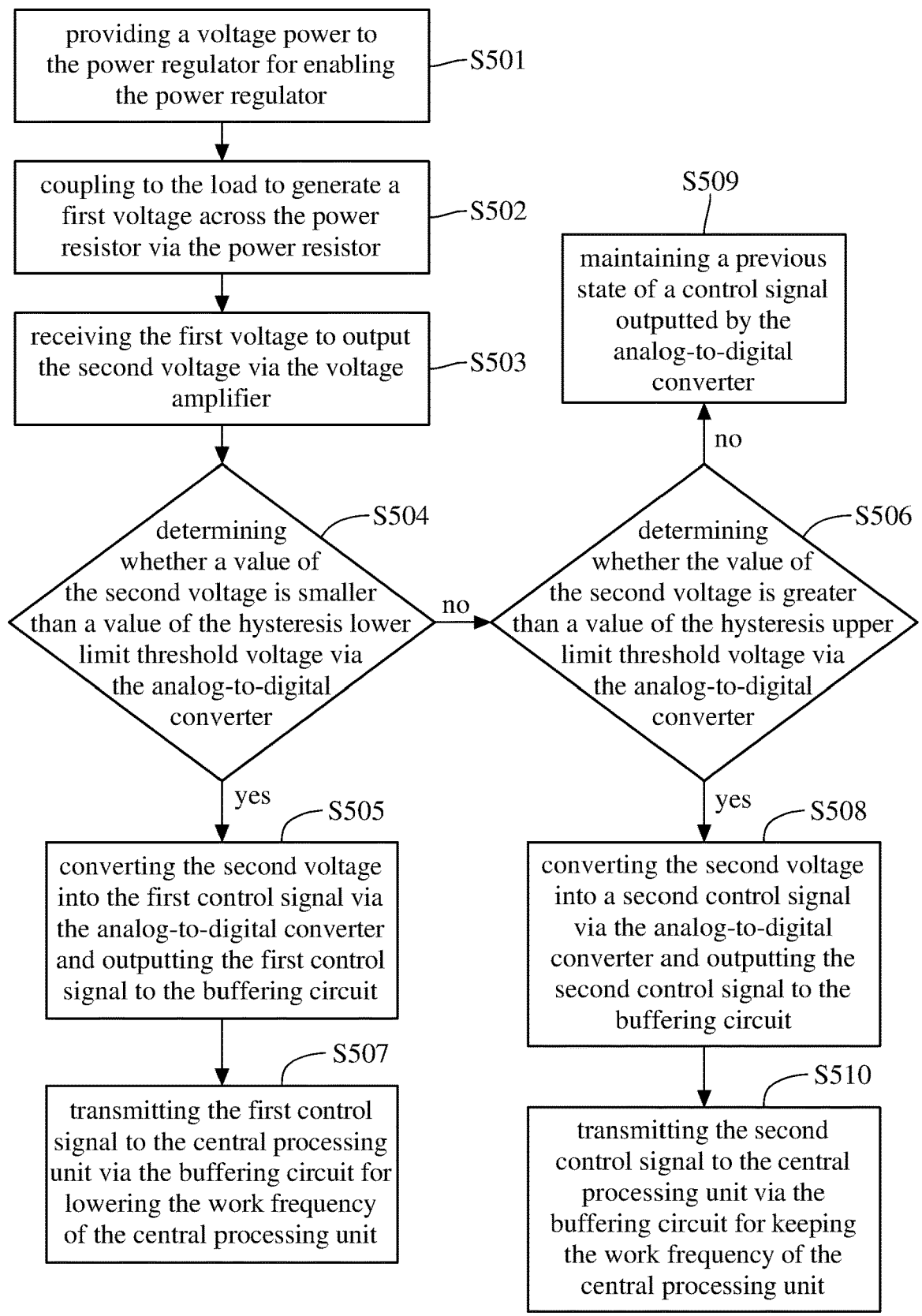
FIG. 5 is a flowchart of a power regulating method according to an embodiment of the present disclosure.

FIG. 5 is a flowchart of a power regulating method according to a first embodiment of the present invention. The power regulating method is applied to adjust a work frequency of the central processing unit 200 and is performed by the power regulator 100. A step S501 is performed, which comprises providing a voltage power to the power regulator 100 for enabling the power regulator 100. A step S502 is performed, which comprises coupling to the load 300 to generate a first voltage V1 across the power resistor RP via the power resistor RP. A step S503 is performed, which comprises receiving the first voltage V1 to output the second voltage V2 via the voltage amplifier 10. A step S504 is performed, which comprises determining whether a value of the second voltage V2 is smaller than a value of the hysteresis lower limit threshold voltage VL via the analog-to-digital converter 20. If the value of the second voltage V2 is smaller than the value of the hysteresis lower limit threshold voltage VL, and then a step S505 is performed. If the value of the second voltage V2 is not smaller than the value of the hysteresis lower limit threshold voltage VL, and then a step S506 is performed. The step S505 comprises converting the second voltage V2 into the first control signal via the analog-to-digital converter 20 and outputting the first control signal to the buffering circuit 30, wherein the second voltage V2 is an analog signal and the first control signal is a digital signal, and then a step S507 is performed. The step S506 comprises determining whether the value of the second voltage V2 is greater than a value of the hysteresis upper limit threshold voltage VH via the analog-to-digital converter 20. If the value of the second voltage V2 is greater than the value of the hysteresis upper limit threshold voltage VH, and then a step S508 is performed. If the value of the second voltage V2 is not greater than the value of the hysteresis upper limit threshold voltage VH, which means that the value of the second voltage V2 is between the value of the hysteresis upper limit threshold voltage VH and the value of the hysteresis lower limit threshold voltage VL, and then a step S509 is performed. The step S507 comprises transmitting the first control signal to the central processing unit 200 via the buffering circuit 30 for lowering the work frequency of the central processing unit 200. The step S508 comprises converting the second voltage V2 into a second control signal via the analog-to-digital converter 20 and outputting the second control signal to the buffering circuit 30, wherein the second voltage V2 is an analog signal and the second control signal is a digital signal, and a step S510 is performed. The step S509 comprises maintaining a previous state of a control signal outputted by the analog-to-digital converter 20. If the previous state of the control signal is at a high level, the analog-to-digital converter 20 outputs a control signal with the high level. If the previous state of the control signal is at a low level, the analog-to-digital converter 20 outputs a control signal with the low level. The step S510 comprises transmitting the second control signal to the central processing unit 200 via the buffering circuit 30 for keeping the work frequency of the central processing unit 200. In other embodiment, the order of the step S504 and the order of the step S506 can be exchanged.

In view of the above description, when the power regulator receives a power to be enabled, the power resistor can be coupled to any node in the host system and the power consumption of the host system can be monitored via a voltage level of a control command outputted by the power regulator. For example, the power resistor can be coupled to a USB port of the host system or coupled to a source end of a motherboard of the host system just like an external transformer, so it is very convenient to use the power resister. Because the power regulator is coupled to a load via the power resister, a user can determine whether the damage of the power resister leads to the malfunction of the power regulator. Moreover, it takes less time to debug the power regulator because replacing the power resistor is easy. Regardless of the total power consumption of the load detected by the power regulator, the power regulator can control the work frequency of the central processing unit through control commands outputted by the power regulator, so that the total power consumption of the host system does not exceed the rated power of the transformer equipped with the host system. In this way, the host system does not need to be equipped with a high-rated transformer to reduce manufacturing costs, so the power regulator is very suitable to a microcomputer, a tablet, or a thin type laptop. Furthermore, the analog-to-digital converter further has a hysteresis voltage circuit for avoiding an occurrence of an oscillating state of the power regulator.

What is claimed is:

1. A power regulator, applied to regulate a work frequency of a central processing unit, comprising:
    a power resistor, with one end of the power resistor coupled to a load and another end coupled to a voltage source to generate a first voltage corresponding to a power consumption of the load;
    a voltage amplifier coupled to the power resistor to amplify the first voltage and to output the amplified first voltage as a second voltage; and
    an analog-to-digital converter, coupled to the output of the voltage amplifier, converting the second voltage into a control signal, and transmitting the control signal to the central processing unit; wherein a level of the control signal is switched between a first level and a second level according to a value of the second voltage to regulate the work frequency of the central processing unit.

2. The power regulator in claim 1, wherein two ends of the power resistor are respectively coupled to a non-inverting input end of the voltage amplifier and an inverting input end of the voltage amplifier.

3. The power regulator in claim 2, comprising a capacitor coupled to the power resistor in parallel, with two ends of the capacitor respectively coupled to the non-inverting input end of the voltage amplifier and the inverting input end of the voltage amplifier.

4. The power regulator in claim 1, wherein the work frequency of the central processing unit is reduced when the control signal is at the first level, and wherein the work frequency of the central processing unit is maintained when the control signal is at the second level.

5. The power regulator in claim 4, wherein the first level is smaller than the second level.

6. The power regulator in claim 1, further comprising a buffering circuit, wherein the input end of the buffering circuit is coupled to the analog-to-digital converter and the output end of the buffering circuit is coupled to the central processing unit.

7. The power regulator in claim 1, further comprising an enabling circuit, wherein the enabling circuit receives an enabling signal and provides power to the power resistor, the voltage amplifier, and the analog-to-digital converter.

8. The power regulator in claim 1, wherein the analog-to-digital converter comprises a hysteresis circuit, the hysteresis circuit has a threshold voltage upper limit and a threshold voltage lower limit, the control signal is at the second level when the value of the second voltage is greater than a value of the threshold voltage upper limit, the control signal is at the first level when the value of the second voltage is less than a value of the threshold voltage lower limit, and the first level is less than the second level.

9. A power regulating method, applied to regulate a work frequency of a central processing unit and performed by a power regulator, and the power regulating method comprising:
receiving a voltage from a voltage source;
coupling to a load to generate a first voltage corresponding to a power consumption of the load via a power resistor of the power regulator, wherein one end of the power resistor is coupled to the load and wherein the other end of the power resistor is coupled to the voltage source;
receiving the first voltage from the power resistor by a voltage amplifier of the power regulator to amplify the first voltage and to output the amplified first voltage as a second voltage;
converting the second voltage into a first level via an analog-to-digital converter of the power regulator to reduce the work frequency of the central processing unit when the value of the second voltage is smaller than a value of a threshold voltage lower limit; and
converting the second voltage into a second level via the analog-to-digital converter to maintain the work frequency of the central processing unit when the value of the second voltage is greater than a value of a threshold voltage upper limit.

10. The method in claim 9, wherein the analog-to-digital converter determines whether the value of the second voltage is smaller than the value of the threshold voltage lower limit, wherein the analog-to-digital converter outputs a first control signal to the central processing unit to reduce the work frequency of the central processing unit when the value of the second voltage is smaller than the value of the threshold voltage lower limit, and wherein the first control signal is at the first level.

11. The method in claim 9, wherein the analog-to-digital converter determines whether the value of the second voltage is greater than the value of the threshold voltage upper limit, wherein the analog-to-digital converter outputs a second control signal to the central processing unit to maintain the work frequency of the central processing unit when the value of the second voltage is greater than the value of the threshold voltage upper limit, and wherein the second control signal is at the second level.

* * * * *